United States Patent
Yang et al.

(10) Patent No.: US 6,905,254 B2
(45) Date of Patent: Jun. 14, 2005

(54) OPTICAL FIBER CONNECTOR

(75) Inventors: Jianning Yang, Kunshan (CN); Jim-Kui Hu, Kunshan (CN); Guo-Hua Zhang, Kunshan (CN); Zi-Qiang Zhu, Kunshan (CN)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 280 days.

(21) Appl. No.: 10/288,112

(22) Filed: Nov. 4, 2002

(65) Prior Publication Data

US 2003/0219216 A1 Nov. 27, 2003

(30) Foreign Application Priority Data

May 24, 2002 (TW) ........................................ 91207534 U

(51) Int. Cl.⁷ ................................................ G02B 6/36
(52) U.S. Cl. ............................ 385/88; 385/92; 385/72
(58) Field of Search ................................ 385/88, 92, 72

(56) References Cited

U.S. PATENT DOCUMENTS

| | | | | |
|---|---|---|---|---|
| 5,708,743 A | * | 1/1998 | DeAndrea et al. | 385/88 |
| 5,909,526 A | * | 6/1999 | Roth et al. | 385/78 |
| 6,004,043 A | * | 12/1999 | Abendschein et al. | 385/76 |
| 6,206,577 B1 | * | 3/2001 | Hall et al. | 385/53 |

* cited by examiner

*Primary Examiner*—John D. Lee
*Assistant Examiner*—James D Stein
(74) *Attorney, Agent, or Firm*—Wei Te Chung

(57) ABSTRACT

An optical fiber connector (3) includes an insert body (31), a door (33), a housing (35), a spring member (36) an optical element (37) and a spacer (39). The door includes a protuberance (332) and defines a through hole (331) for receiving a shaft (34). The shaft is held between the insert body and the housing. The door can rotate inwardly into an inserting hole (351) defined by the housing when a fiber plug (4) is inserted the inserting hole. When the fiber plug is pulled out from the housing, the door is rotated to cover the inlet side of the inserting hole due to a spring force applied by the spring member against the door.

20 Claims, 7 Drawing Sheets

OPTICAL FIBER CONNECTOR

BACKGROUND OF THE INVENTION

1. Field of the Invention

The present invention relates to an optical fiber connector, and particularly to an optical fiber connector having a spring member for applying a resilient force to press against and securely retain a fiber plug inserted into the optical fiber connector.

2. Description of Related Art

Present day telecommunication technology utilizes, to an increasing extent, optical fibers for signal transmission. The use of optical fibers, in turn, requires numerous collateral components especially adapted to handle the light or optical transmissions, among which are optical fiber connectors.

Optical fiber connectors for making connections between digital audio systems normally mate with a ferrule on a terminating end of the fiber. The ferrule is for alignment and support of the fiber made from glass or plastic. The ferrule is inserted into a receiving hole of a housing of the optical fiber connector. Examples of optical fiber connector that connects with a plastic fiber terminated in a ferrule include: i) the F07 Duplex Plastic Fiber System from AMP; ii) the SMI (small Muti-media Interface) Connector from Sony Corporation; and iii) the HFBR series of plastic fiber connectors from Hewlett Packard. To ensure performance of the optical connector, a door need to be provided to prevent dust and vapor in the air from entering the receiving hole of the housing.

For example, as shown in FIG. 8, Japanese Patent Publication No. 6-331859 discloses an optical fiber connector, which comprises a housing 1 holding an optical element 11, and a rotatable door 13 assembled to the housing 1. A fiber plug 2 and a fiber 21 are received in the fiber connector. The housing 1 defines a cavity 12 for receiving the fiber plug 2. However, the rotatable door 13 is not retained in the housing 1, so can be easily to be damaged. Furthermore, the optical fiber connector takes up more space when the fiber plug 2 is inserted in the cavity 12, since the rotatable door 13 is at outside of the housing 1.

It is thus desirable to provide an improved optical connector for overcoming the above problems.

SUMMARY OF THE INVENTION

An object of the present invention is to provide an improved optical fiber connector having a door which is contained within a housing of the optical fiber connector when a fiber plug is inserted in the housing.

Another object of the present invention is to provide an optical fiber connector having an spring member for applying a resilient retaining force to a fiber plug mated with the optical fiber connector.

An optical fiber connector comprises an insert body, a door, a housing, a spring member, an optical element and a spacer.

The door comprises a protuberance and defines a through hole for receiving a shaft.

The insert body is inserted into an inserting hole of the housing and is mounted therein by engagement of keys of the insert body with notches of the housing. A faceplate of the insert body partially covers an inlet side of the inserting hole. An opening of the insert body communicates with the inserting hole of the housing. Two opposite slots defined in the housing receive two opposite ends of the shaft therein. The door is attached between the insert body and the housing and closes the opening of the insert body to prevent dust and vapor from entering the inserting hole. The spacer is inserted into a rear side of the housing and engages with the housing by keys of the spacer coupling with keys of the housing. The optical element is mounted between the housing and the spacer.

When a fiber plug is received in the insert body and the housing, the spring member anchored in a recess of the housing applies to a force against the door, tightly pushing the door against the fiber plug. When the fiber plug is pulled out from the housing, the door rotates and covers the inlet side of the inserting hole due to a spring force applied by the spring member against the door.

Other objects, advantages, and novel features of the present invention will become more apparent from the following detailed description when taken in conjunction with the accompanying drawings.

DETAILED DESCRIPTION OF THE INVENTION

Figure 1:
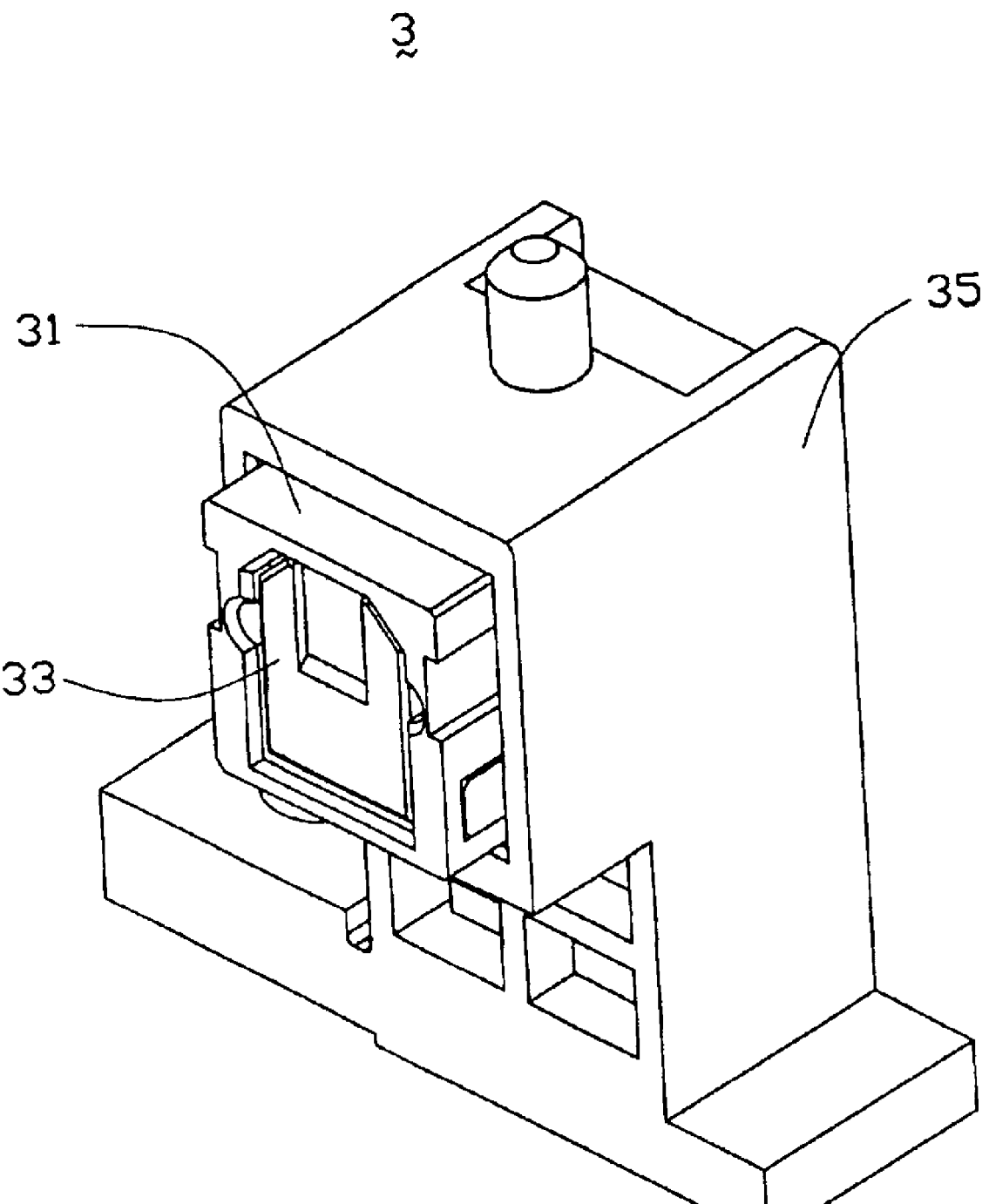
FIG. 1 is an assembled view of an optical fiber connector according to the present invention.
Figure 2:
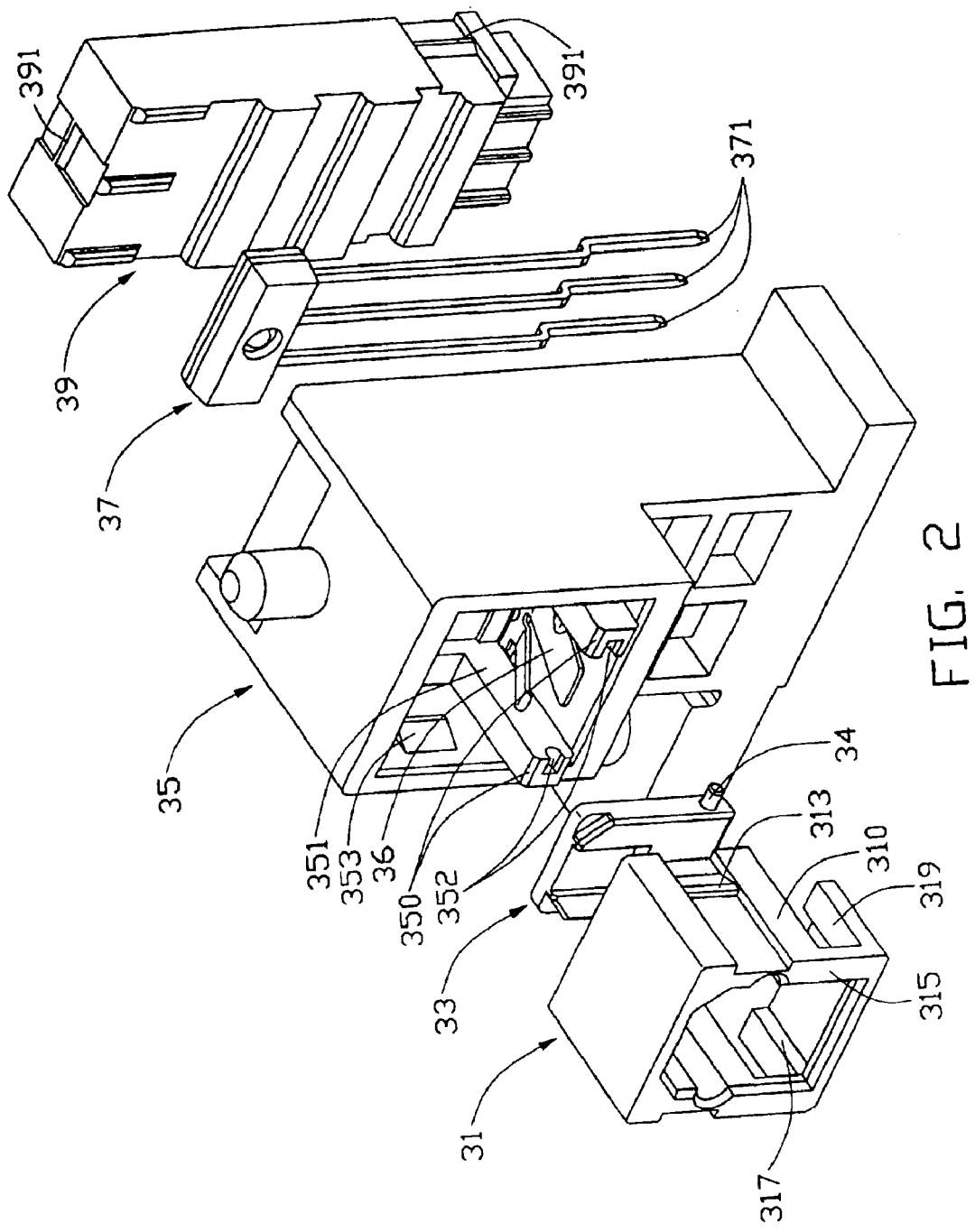
FIG. 2 is a perspective, exploded view of FIG. 1.

As shown in FIGS. 1 and 2, an optical fiber connector 3 comprises an insert body 31, a door 33, a shaft 34, a housing 35, a spring member 36, an optical element 37 and a spacer 39.

The insert body 31 comprises a pair of keys 313 formed on two opposite sidewalls 310, respectively, and a faceplate 315. An opening 317 is defined through the middle of the faceplate 315. Two opposite channels 319 are defined through the two opposite sidewalls 310, respectively. The insert body has a top and bottom sides (not labeled) but is open at a rear side.

Figure 3:
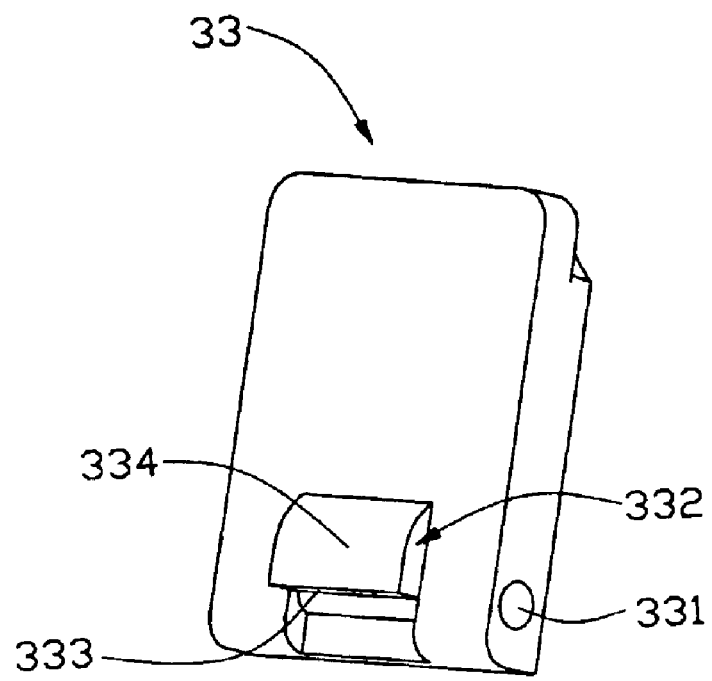
FIG. 3 is a perspective view of a door of the optical fiber connector of FIG. 1.

Referring to FIG. 3, the door 33 is generally slab-shaped, comprises a protuberance 332 and defines a through hole 331 for receiving the shaft 34. The protuberance 332 protrudes from one side of the door 33, and has a sliding face 334 and a lower face 333.

Figure 4:
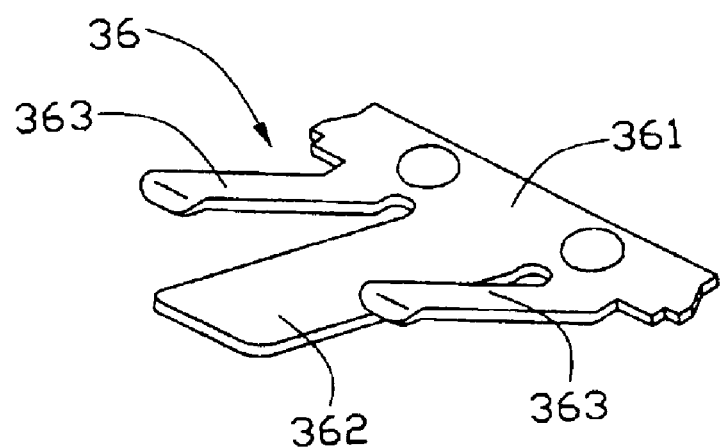
FIG. 4 is a perspective view of a spring member of the optical fiber connector of FIG. 1.

Referring to FIG. 4, the spring member 36 comprises a fixing portion 361, a contacting portion 362 and a pair of fingers 363. The contacting portion 362 extends from the fixing portion 361 and is positioned between the pair of fingers 363, which extend from the fixing portion 361. A pair of bosses (not labeled) protrude from a top surface of the fixing portion 361 and a pair of flanges (not labeled) protrude from side edges of the fixing portion 361 to aid in securing the fixing portion 361 in the housing 35.

Referring to FIG. 2, the housing 35 comprises two opposite ridges 350 each defining a slot 352 at its end, and defines an inserting hole 351 for accepting the insert body 31 therein, and a recess 354 (see FIG. 5) for receiving and mounting the fixing portion 361 of the spring member 36 therein.

The optical element 37 comprises a plurality of terminals 371. The optical element 37 for receiving or emitting light signals connects with a printed circuit board (not shown) through the terminals 371. The optical element 37 is mounted in a mounting aperture (not labeled) by engaging the spacer 39 to the housing 35.

Figure 5:
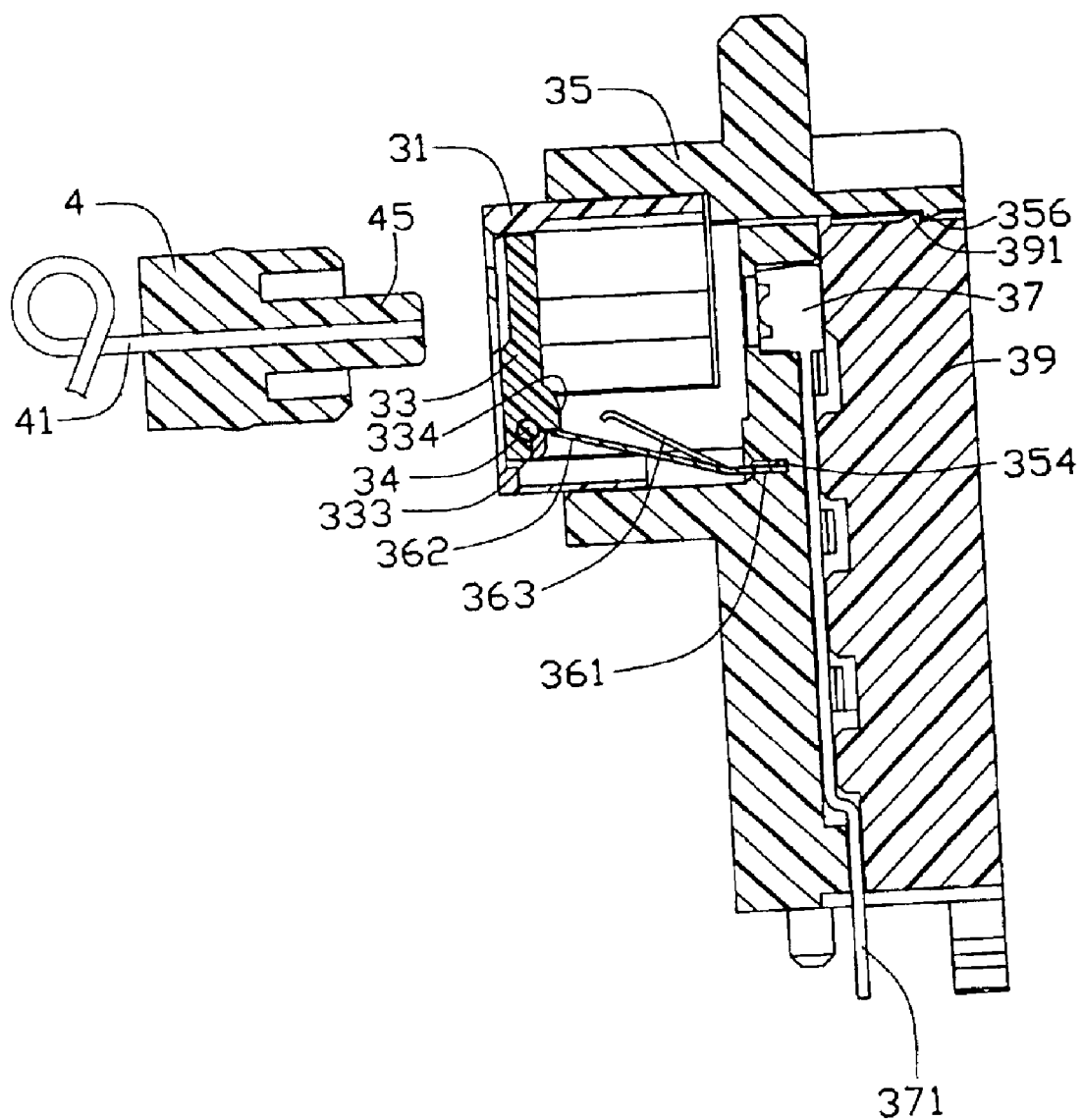
FIG. 5 is a cross-sectional view of the optical fiber connector of FIG. 1, with a fiber plug.

In assembly, as shown in FIG. 5, the fixing portion 361 of the spring member 36 is mounted in the recess 354 of the housing 35. The shaft 34 is inserted through the through hole of the door 33 and the shaft ends (not labeled) are engaged in the slot 352 of the housing 35. The insert body 31 is inserted into the inserting hole 351 of the housing 35 and is retained therein by coupling the keys 313 of the insert body 31 with notches 353 of the housing 35. The faceplate 315 of the insert body 31 covers the inlet side of the inserting hole 351. The opening 317 of the insert body 31 and the inserting hole 351 of the housing communicate with each other. The channels 319 cooperate with the ridges 350 and the faceplate 315 engages with the end faces of the ridges to secure the two opposite ends of the shaft 34 in the slots 352. Then the door 33 attached to the inlet side of the inserting hole 351 closes the opening 317 of the insert body 31 to prevent dust and vapor from entering the inserting hole 351. The spacer 39 is inserted into a rear side (not labeled) of the housing 35 and engages with the housing 35 by the keys 391 of the spacer 39 coupling with keys 356 of the housing 35. The optical element 37 is mounted between the housing 35 and spacer 39.

Figure 6:
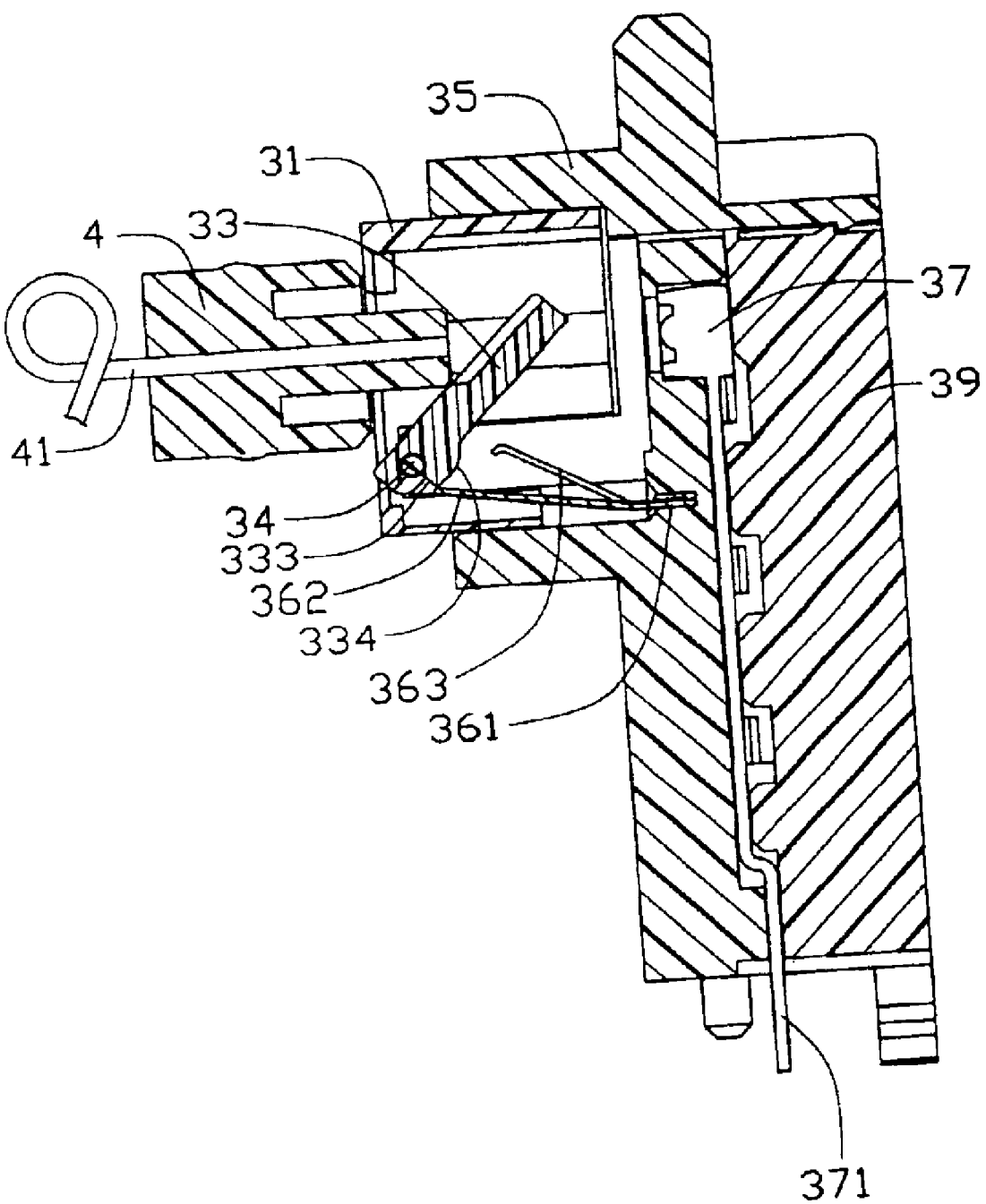
FIG. 6 is a cross-sectional view of the optical fiber connector of FIG. 1, with the fiber plug partly inserted therein o.

As shown in FIG. 6, the fiber plug 4 comprises a fiber 41 made from glass or plastic and a ferrule 45. The door 33 is rotated inwardly in the housing 35 about the shaft 34 by insertion of the fiber plug 4 in the inserting hole 351, wherein the contacting portion 362 of the spring member 36 slides along the sliding face 334 of the door 33 until the fiber plug 4 is completely inserted into the housing 35.

Figure 7:
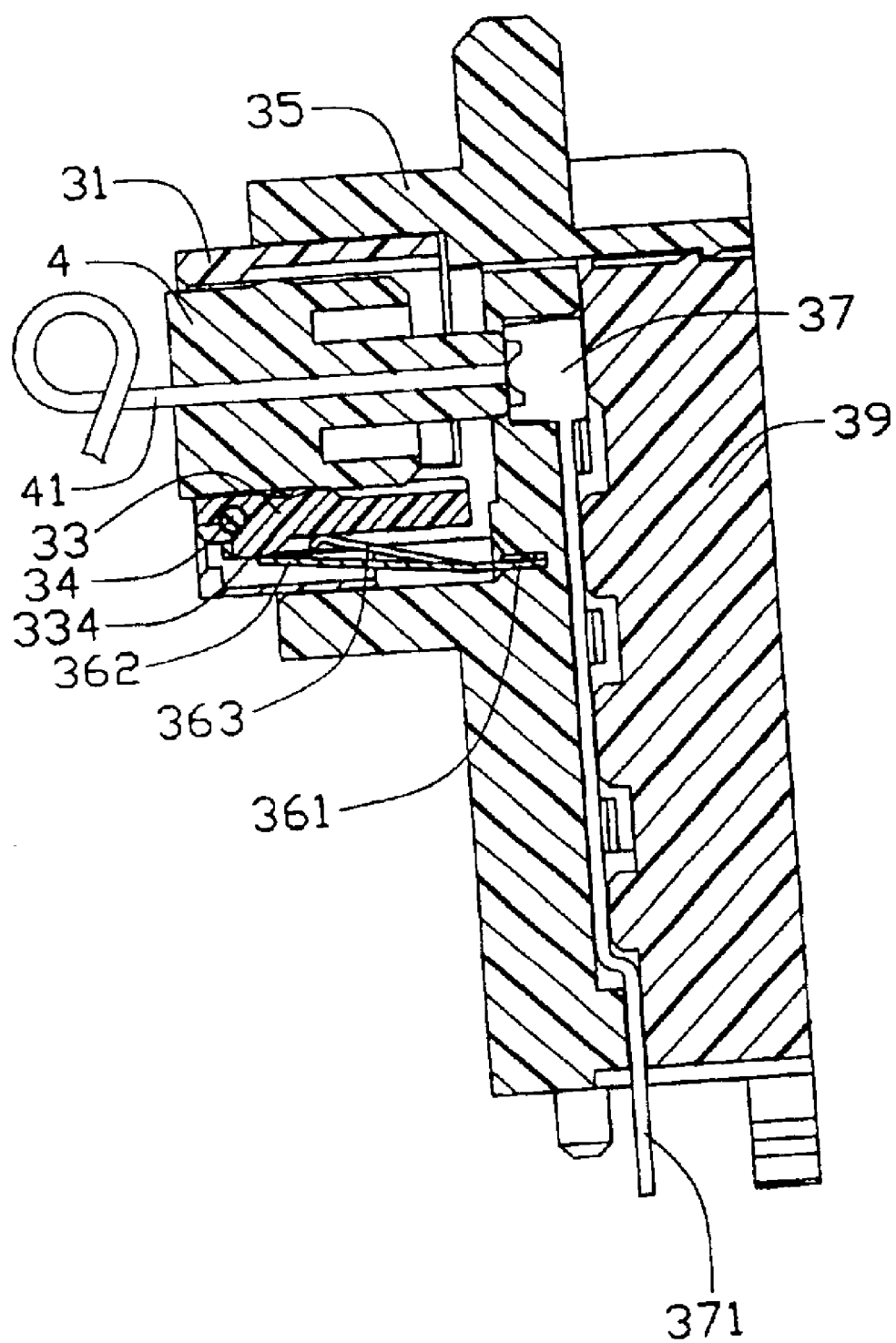
FIG. 7 is a cross-sectional view of the optical fiber connector of FIG. 1, with the fiber plug completely inserted therein.
Figure 8:
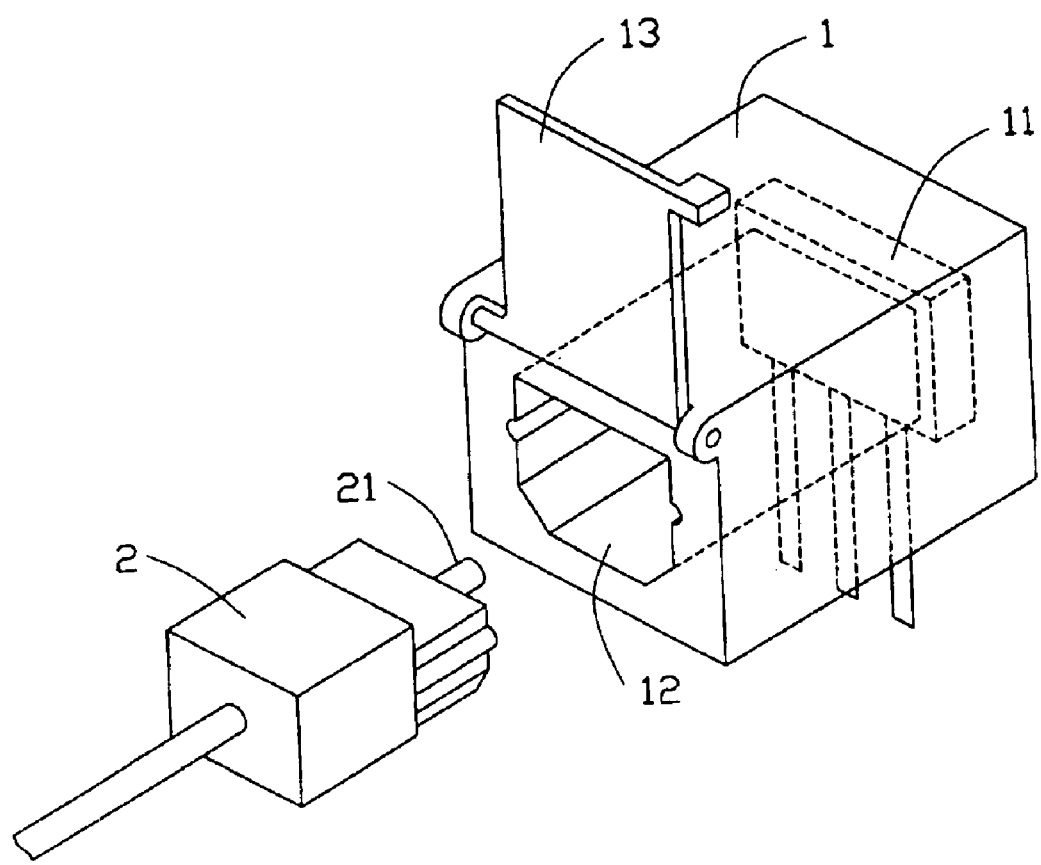
FIG. 8 shows a prior art optical connector.

Referring to FIG. 7, the fiber plug 4 is received in the insert body 31 and the housing 35. An end of the fiber 41 opposes the optical element 37. The door 33 is retained in the housing 35 and contact spring member 36. The spring member 36 is anchored in the recess 354 of the housing 35 and applies a force against the door 33, tightly pushing the door 33 against the fiber plug 4. The fiber plug 4 is thus securely mounted in the housing 35 because of the pressing force from the door 33.

When the fiber plug 4 is pulled out from the housing 35, the door 33 rotates and covers the inlet side of the inserting hole 351 due to a spring force applied by the contacting portion 362 of spring member 36 against the protuberance 332 of the door 33. In a close portion, the contacting portion 362 presses against the lower face 333 of the door 33, ensuring that the door 33 covers the inlet side of the inserting hole 351.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber connector for receiving a fiber plug, comprising:
    a housing defining an inserting hole;
    a door being attached to the housing and moving an inlet side of the inserting hole, and comprising a protuberance; and
    a spring member mounted with the housing and comprising first and second contacting portion, the first contacting portion contacting with said protuberance of the door;
    wherein the door rotates inwardly into and is received in the inserting hole of the housing by insertion of the fiber plug in the inserting hole and at the beginning of this process the door is urged by the first contacting portion of the spring member; and when the fiber plug is pulled out from the inserting hole of the housing, two-stage spring force applied by the first and second contacting portion of the spring member against the door restores the door to its closed state to cover the inlet side of the inserting hole.

2. The optical fiber connector as claimed in claim 1, wherein the door defines a through hole which receives a shaft.

3. The optical fiber connector as claimed in claim 2, wherein the housing further comprises two ridges each defining a slot in its end face, each slot being for receiving a different end of the shaft, when the door is attached to the housing.

4. The optical fiber connector as claimed in claim 3, wherein the spring member further comprises a fixing portion mounted in a recess of the housing, and the second contacting portion is in a means that a pair of fingers extending from the fixing portion, the first contacting portion also extending from the fixing portion and positioned between the pair of second contacting portion.

5. The optical fiber connector as claimed in claim 4, wherein the contacting portion of the spring member slides along the sliding face when the door rotates about the shaft.

6. The optical fiber connector as claimed in claim 5, further comprising an insert body mounted in the inserting hole of the housing, which comprises a faceplate covering a portion of the inlet side of the inserting hole.

7. The optical fiber connector as claimed in claim 6, wherein the faceplate defines an opening for insertion of the fiber plug thereinto, the door closing the opening of the faceplate to prevent dust and vapor from entering the inserting hole.

8. The optical fiber connector as claimed in claim 6, wherein the faceplate of the insert body abuts with the end faces of the ridges to retain the shaft in the hole.

9. The optical fiber connector as claimed in claim 1, further comprising an optical element and a spacer, the optical element being mounted in the housing by engagement of the spacer to the housing.

10. A connector for use with a complementary connector, comprising:
    a housing defining an inserting port with an opening communicating with an exterior;
    a door pivotally attached to the housing around said opening;
    spring mechanism assembled on the housing and including first and second pieces; wherein
    the first piece is constantly engaged around a pivot portion of the door while the second piece with a portion extending into a rotation path of said door, so as to commonly form two stages restoration force arrangement between the spring member and the door.

11. The connector as claimed in claim 10, wherein only the first piece urges the door when said door is in a closed position while both the first and second pieces urge the door when said door is in an opening position with the complementary is mated therewith.

12. The connector as claimed in claim 10, wherein said connector is an optical connector.

13. The connector as claimed in claim 10, wherein said first piece and second piece extend into the insertion port.

14. The connector as claimed in claim 10, wherein said door is sandwiched between the complementary connector and at least one of said first piece and said second piece when said complementary connector is fully inserted. into the insertion port.

15. The connector as claimed in claim 10, wherein said first piece and said second piece are integrally formed as one unit.

16. The connector as claimed in claim 10, wherein said first piece and said second piece are commonly located on a same side of said insertion port.

17. An optical fiber connector for receiving a fiber plug, comprising:
   a housing defining an inserting hole;
   a door being attached to the housing and covering an inlet side of the inserting hole; and
   a spring member mounted within the housing;
   wherein the door rotates inwardly into and is received in the inserting hole of the housing by insertion of the fiber plug in the inserting hole, and when the fiber plug is pulled out therefrom, a spring force applied by the spring member against the door restores the door to its closed state to cover the inlet side of the inserting hole;
   wherein
   the door defines a through hole which receives a shaft, and comprises a protuberance which contacts with the spring member, and the protuberance has a sliding face and a lower face.

18. The optical fiber connector as claimed in claim 17, wherein the housing further comprises two ridges each defining a slot in its end face, each slot being for receiving a different end of the shaft, when the door is attached to the housing.

19. The optical fiber connector as claimed in claim 18, wherein the spring member comprises a fixing portion mounted in a recess of the housing, a contacting portion contacting with the protuberance and two fingers.

20. The optical fiber connector as claimed in claim 19, wherein the contacting portion of the spring member slides along the sliding face when the door rotates about the shaft.

* * * * *